United States Patent
Al-Damluji

(10) Patent No.: US 12,267,371 B2
(45) Date of Patent: Apr. 1, 2025

(54) SESSION BORDER CONTROLLER FOR MESSAGE MANIPULATION

(71) Applicant: MICROSOFT TECHNOLOGY LICENSING, LLC, Redmond, WA (US)

(72) Inventor: Salem Amin Al-Damluji, Enfield (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 6 days.

(21) Appl. No.: 17/341,336

(22) Filed: Jun. 7, 2021

(65) Prior Publication Data

US 2022/0329634 A1 Oct. 13, 2022

(30) Foreign Application Priority Data

Apr. 9, 2021 (GB) ..................... 2105114

(51) Int. Cl.
*H04L 65/1104* (2022.01)
*H04L 65/1045* (2022.01)
*H04L 69/327* (2022.01)

(52) U.S. Cl.
CPC ...... *H04L 65/1104* (2022.05); *H04L 65/1045* (2022.05); *H04L 69/327* (2013.01)

(58) Field of Classification Search
CPC ............... H04L 65/1104; H04L 69/327; H04L 65/1046; H04L 69/22; H04L 65/1033; H04L 65/1045; H04L 67/147
See application file for complete search history.

(56) References Cited

U.S. PATENT DOCUMENTS

| 10,015,647 | B1 * | 7/2018 | Garre | H04W 24/08 |
| 11,038,929 | B1 * | 6/2021 | Piscopo | H04L 65/1104 |
| 2007/0201472 | A1 * | 8/2007 | Bhatia | H04L 47/193 |
| | | | | 370/392 |
| 2011/0317689 | A1 * | 12/2011 | MeLampy | H04L 65/1069 |
| | | | | 370/352 |

(Continued)

FOREIGN PATENT DOCUMENTS

| EP | 2876859 A1 | 5/2015 |
| GB | 1911927 | * 10/2019 |

OTHER PUBLICATIONS

"Oracle® Enterprise Session Border Controller", Retrieved From: https://docs.oracle.com/cd/E85013_01/doc/esbc_ecz750_hmr.pdf, Aug. 2017, 90 Pages.

(Continued)

*Primary Examiner* — Jerry B Dennison
(74) *Attorney, Agent, or Firm* — Han Gim; Newport IP, LLC

(57) ABSTRACT

A session border controller has a processor operable to receive a message from a connected peer node. The processor inputs the message to a Message Manipulation Function, MMF, which identifies the message as a SIP message, and in response obtains external state data associated with the message from a source independent from the message. The external state data is provided to the MMF. The SIP message is modified using the MMF according to one or more conditions or rules associated with the received external state data; and the modified message is output.

20 Claims, 4 Drawing Sheets

First Network Arrangement

(56) References Cited

U.S. PATENT DOCUMENTS

| | | | |
|---|---|---|---|
| 2015/0149648 A1* | 5/2015 | Phillips | H04L 65/1086 |
| | | | 709/228 |
| 2019/0281158 A1* | 9/2019 | Gupta | H04L 63/08 |
| 2020/0162851 A1* | 5/2020 | Wilde | G02B 27/017 |
| 2020/0213221 A1* | 7/2020 | Sharma | H04L 41/122 |
| 2020/0218984 A1 | 7/2020 | Thornton et al. | |
| 2021/0058749 A1* | 2/2021 | Al-Damluji | H04L 65/1104 |

OTHER PUBLICATIONS

"SIP Message Manipulation Overview", Retrieved from: https://support.sonus.net/display/UXDOC61/SIP+Message+Manipulation+Overview, Retrieved Date: Mar. 2, 2021, 8 Pages.

"SIP Message Syntax", In Reference Guide of Audiocodes, Version 7.2, Document #: LTRT-29052, Apr. 25, 2021, 128 Pages.

"International Search Report and Written Opinion Issued in PCT Application No. PCT/US22/020672", Mailed Date: Jun. 24, 2022, 10 Pages.

Intention to Grant Received for European Application No. 22714719.6, mailed on Oct. 18, 2024, 7 pages.

Decision to grant a European patent pursuant to Article 97(1) received in European Application No. 22714719.6, mailed on Jan. 23, 2025, 2 pages.

* cited by examiner

SESSION BORDER CONTROLLER FOR MESSAGE MANIPULATION

CROSS-REFERENCE TO RELATED APPLICATION(S)

This non-provisional utility application claims priority to UK patent application number 2105114.9 entitled "SESSION BORDER CONTROLLER FOR MESSAGE MANIPULATION" and filed on 9 Apr. 2021, which is incorporated herein in its entirety by reference.

BACKGROUND

Session border controllers (SBCs) are network elements at a point of demarcation between different parts of a communications network, such as a firewall between an intranet of an enterprise and the public Internet, or a filtering router between regions of a communications network having different security provisions. SBCs are typically used to protect Session Initiation Protocol (SIP) based Voice over Internet Protocol (VoIP) networks.

The embodiments described below are not limited to implementations which solve any or all of the disadvantages of known session border controllers.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a session border controller which has a processor operable to receive a message from a connected peer node. The processor inputs the message to a Message Manipulation Function, MMF, which identifies the message as a SIP message, and in response obtains external state data associated with the message from a source independent from the message. The external state data is provided to the MMF. The SIP message is modified using the MMF according to one or more conditions or rules associated with the received external state data; and the modified message is output.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

SBCs are network elements at a point of demarcation between different parts of a communications network, such as a firewall between an intranet of an enterprise and the public Internet, or a filtering router between regions of a communications network having different security provisions. Sessions between parties in the different regions of the communications network traverse the SBC and the SBC is able to influence packets in those sessions for various purposes such as security, connectivity, quality of service, emergency call prioritization, media services and more. An SBC is typically inserted into a media or signaling path between endpoints in a VoIP call. The inventors have recognized that extending the functionality of an SBC is beneficial as described in more detail below.

In various examples an SBC has a component comprising message manipulation function. Message manipulation function MMF is a programming language that is used to carry out detailed manipulation of protocol messages. For example, an MMF component can be configured on a SIP network device to add, remove, or alter a SIP request line, header, or SIP message body. A programmer is able to create code using MMF and deploy that on an SBC in order to solve unanticipated problems quickly.

The inventor has recognized that a component comprising MMF within an SBC is generally limited in functionality. A programmer is able to create code using MMF such as by writing rules or conditions for identifying particular packets and treating them in a way specified in the rule. Functionality is limited since the MMF only has access to internal state data. The term "internal state" is used to refer to data available in messages within a SIP session traversing an SBC. Since this type of data is available within the SBC it is referred to as internal state data.

Figure 1:
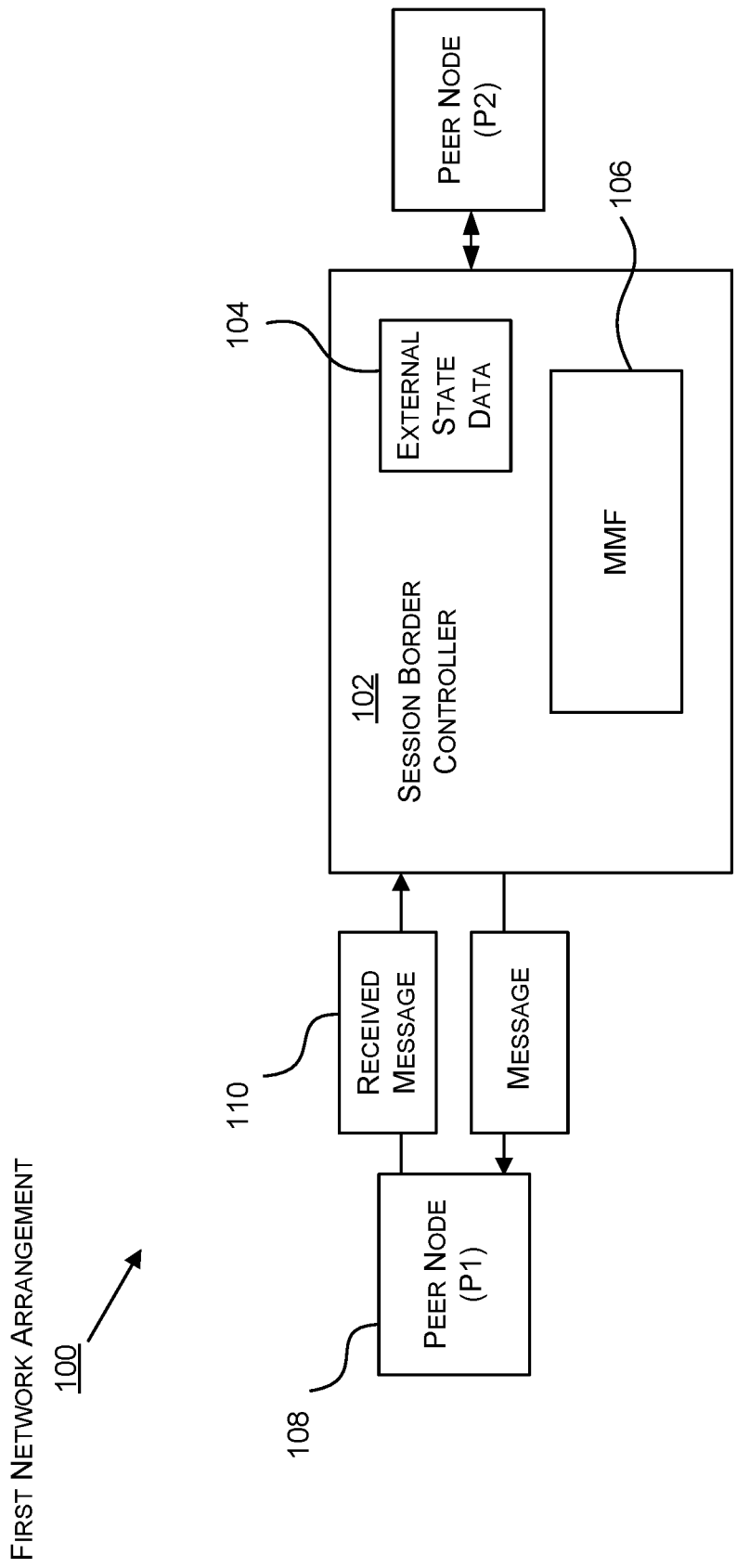
FIG. 1 is a schematic diagram of an apparatus allowing for greater flexibility in the state that MMF is configured to access.

FIG. 1 is a schematic diagram of an apparatus allowing for greater flexibility in the state that an MMF component is configured to access. There is shown in FIG. 1 a first network arrangement 100. The first network arrangement 100 comprises a Session Border Controller (SBC) 102 comprising a message manipulation function MMF 106 as well as external state data 104. The term "external state data" is explained in detail below. The SBC is connected between a first peer node P1 and a second peer node P2. In an example, P1 is in a first network region and P2 is in a separate network region so that the SBC demarks the first and second network regions. Peer node P1 is part of a larger communications network which is not shown in FIG. 1. Likewise, P2 is part of a larger communications network which is not shown in FIG. 1. In an example, there is a communication session ongoing between an endpoint in P1's network and an endpoint in P2's network and which traverses the SBC. P1 and P2 are any type of communications network node such as a router, switch or other communications network node.

The MMF 106 is able to carry out detailed manipulation of the contents of a protocol message 110 received from a first peer node, P1, 108 on the basis of external state data 104 and optionally also internal state data. The term "external state data" refers to data which is logically independent from the contents and networking properties of a particular message.

The first peer node P1 108 transmits the message 110 to the SBC 102 which processes the message with the MMF 106. Having received the message 110, the MMF 106 identifies the message as a SIP message, and in response to this verification, modifies the message according to one or more conditions or rules associated with one or more items of external state data 104, optionally alongside one or more items of internal state data extracted from or relating to the message 110 itself. The MMF 106 is hence provided with external state data 104 in addition to internal state data.

The external state data 104 is available at the SBC in some cases such as where the SBC already has data which is logically independent from the contents and networking properties of a particular message. In other cases, the SBC has to actively obtain the external state data 104 by sending a query or request message to one or more remote entities such as management nodes, routers, switches or other nodes in the network of P1 and/or the network of P2. The requests are either sent "on the fly" when the external state data is needed by the MMF, or are sent on a regular basis in order to populate a store at the SBC. In some cases, the SBC receives the external state data from other nodes which send that data when it becomes available or is updated. The SBC then stores the external state data it receives in a store at the SBC for later use by the MMF.

Where the MMF uses only internal state data, it is used as a basic message manipulation function, and data used in such a manipulation is derived from the received message 110. Standard MMF syntax gives operators access to variables, which they can then use both to test conditions, to set message values, and other similar purposes. For example, in an SIP MMF syntax, an example rule is:

IF(msg.request_uri.value=='12345'):

SET msg.p_asserted_id.value=msg.from.value

This rule sets the value of the SIP P-Asserted-Identity header to be whatever the value of the "SIP From header" currently is, if the Request Uniform Resource identifier (URI) is "12345". This uses the values of particular SIP headers as variables, both for purposes of testing a condition, and setting a value.

Variables are drawn from one or more of the following sources: the contents of the message (e.g. the value of a particular header); networking properties of the message (e.g. the IP address to which the message is being sent); logical inferences from the above (e.g. msg.is_behind_nat might be False if the Via header matches the networking IP address, and True otherwise); and/or user-created variables derived from the above (whether stored for the lifetime of a message, a dialog, or a transaction).

However, a networking device, such as P1 108, has access to much more information that pertains to a particular message, but which is logically independent from the contents and networking properties of a particular message. This is particularly likely for devices dealing in stateful protocols such as SIP. This state may correspond to the interaction of the message with an external device configuration, the state of a transaction associated with the message, the state of networking devices associated with the message, or other similar state. It may also include combinations of the above. An external device configuration includes any device configuration other than MMF.

In various embodiments, specialized MMF syntax is used give access to the external state of P1 108 pertaining to the message. This provides an advantage by allowing the MMF to use and make decisions based on external state data related to the processing of the message flows, and/or related calls, that has not conventionally been considered part of the scope of MMF. This allows for much richer processing.

In one example, an SBC might obtain external state data corresponding to one or more of: whether the call on which the message was received is carrying out transcoding, whether the message has triggered a ban listing rule, whether the call on which the message was received is currently ringing, and/or whether the message originates from a registered subscriber.

Such external state may be useful in crafting MMF rules. For example, it allows an operator to apply different MMF on messages from registered subscribers compared to messages not from registered subscribers.

Using the external state, the SBC implements one or more of the abovementioned rules to yield an output message. The output message, which is a modified version of the received message 110, is then forwarded to P2 as part of the ongoing session traversing P1, the SBC and P2.

In one example, a message received on a SIP call can have MMF syntax applied on that message which includes use of the device's external state for the call, such as whether the call is from a registered subscriber. The state made available to the MMF for such use may be all external states, or a subset thereof.

For example, an SBC vendor might wish to restrict the external state available to the MMF to only be a subset of state. This might be because one or more of the external states is proprietary, technically unstable, etc. A network operator might wish to restrict the external state available to particular users configuring the device. For example, some users are not authorized to access whether a particular call is subject to Lawful Intercept.

The external state may be made available for testing conditions, for setting message values, or even for being changed.

For example, if testing conditions, considering whether a message is from a registered subscriber, and if it is, do "X". Otherwise, do "Y". In a further example, when the external state is used for setting message values, the message's SIP Contact header can be set to the IP address of the registered subscriber it comes from. In a further example, when the external state is used for changing external values, the IP address of the registered subscriber associated with this message can be set to be the IP address in the SIP Contact header.

Different subsets of state may be made available for the abovementioned purposes.

Different subsets of state may be available to different tiers of users. For example, in one implementation, most external states will only be available to classes of super-users so that approved users can write MMF rules solving customer problems, but customers themselves cannot set rules which might negatively impact performance.

The disclosure herein may allow more problems to be solved purely via MMF, rather than necessitating feature development, by allowing richer MMF rules to be written. For example, a network operator might wish to configure different session description protocol (SDP) manipulation depending on whether the call is using transcoding, or not.

The or each embodiment as disclosed herein may be used individually or in combination with other MMF features, including allowing the outputs of one set of MMF to be inputs for another. For example, one embodiment requires complex behavior on emergency calls from unregistered endpoints. This required significant time and complexity to be produced. However, with an appropriate combination of MMF features, it was entirely delivered via MMF. This allows feature delivery in a far cheaper and more agile manner.

The ability to use external state within the MMF improves the functioning of the underlying SBC. The functioning of the SBC is improved since in response to identifying the message as a SIP message, external state data associated with the message from a source independent from the message is provided to the MMF. The MMF is able to modify the message according to one or more conditions or rules associated with the received external state data; and output the modified message.

Figure 2:
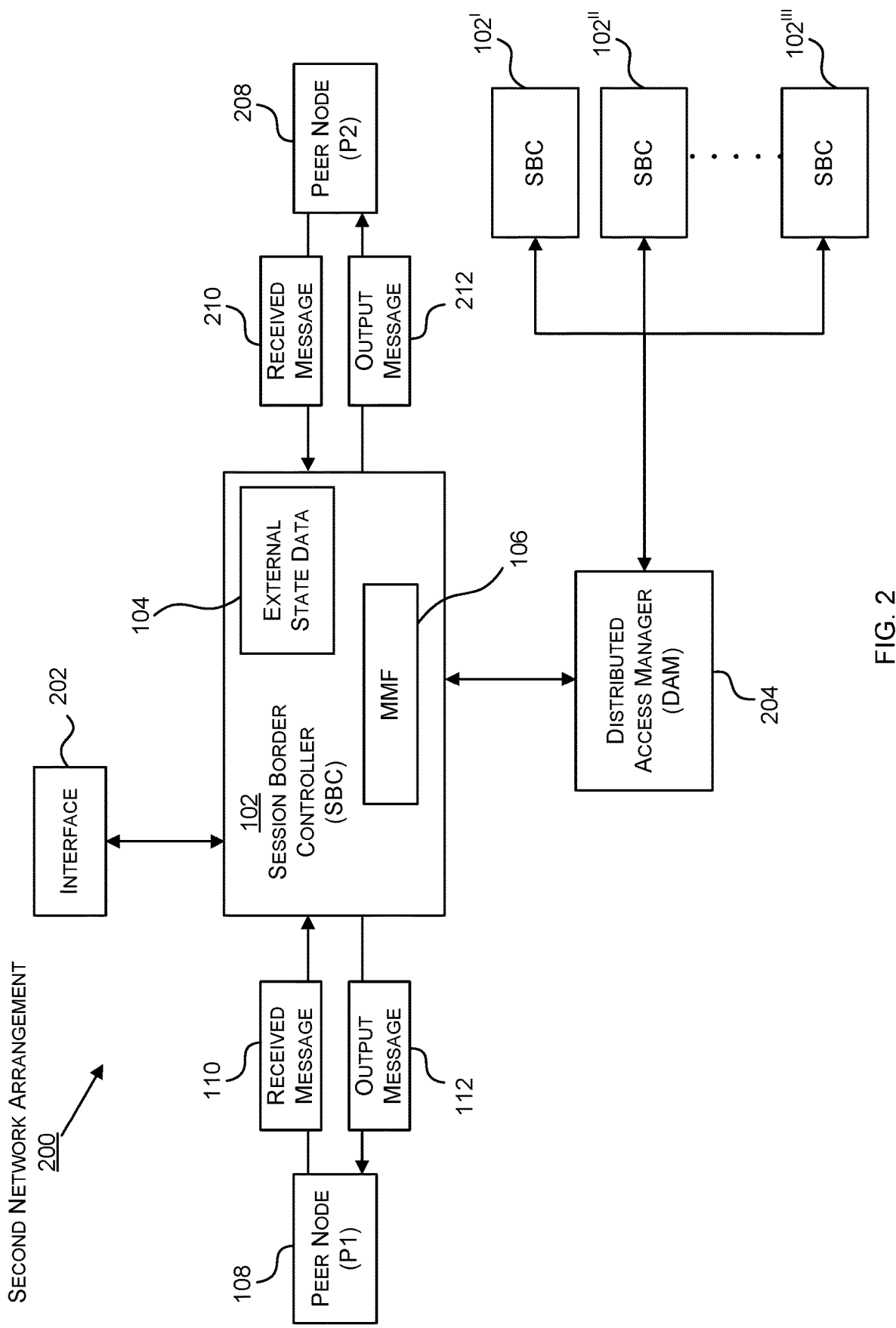
FIG. 2 is a schematic diagram of the apparatus of FIG. 1 in electronic communication with other communications network nodes.

In FIG. 2, there is shown schematic diagram of the apparatus of FIG. 1 in electronic communication with further apparatus, referred to collectively a second network arrangement 200. This second network arrangement 200 comprises the network of the first network arrangement 100 as well as some further apparatus used to enhance the function of the arrangement.

This further apparatus includes an interface 202, shown in electronic communication with the SBC 102. This interface 202 is used to implement any of the permission-based controls outlined above. The interface 202 comprises one or more rules which check login details of users and records of what permissions different users are entitled to. The interface is either part of the SBC 102 or is a separate component connected to the SBC.

The SBC 102 of this embodiment is also in electronic communication with a second peer node, P2 208. Similarly to P1 108, P2 208 is operable to transmit a message 210 to the SBC 102. This message 210 can be modified by the SBC 102 in a similar manner to that of the message 110 from P1 108, according to one or more conditions or rules associated with one or more items of external state data 104. It is understood that one or more further peer nodes P3-PX etc. can be connected to the SBC 102.

The SBC 102 is also connected to a distributed access manager (DAM) 204. The role of the DAM 204 is to provide a connection between a first SBC 102 and one or more further SBCs 102', 102", etc. In such a way, the functionality of one or more of the SBCs 102, 102', 102" is enhanced. For example, the capacity requirements of each node P1 108, P2 208 etc. are considered and a message from the one or more nodes is rejected if capacity is at risk of being exceeded. Further, data relevant to one or more of the received messages may only be found within a separate SBC. For example, data relevant to the peer node P1 108 and the received message 110 may be found by SBC 102'. In such a case, the relevant data is transmitted from SBC 102' to SBC 102 so that it is used by the MMF 106 to modify the output message 112.

Figure 3:
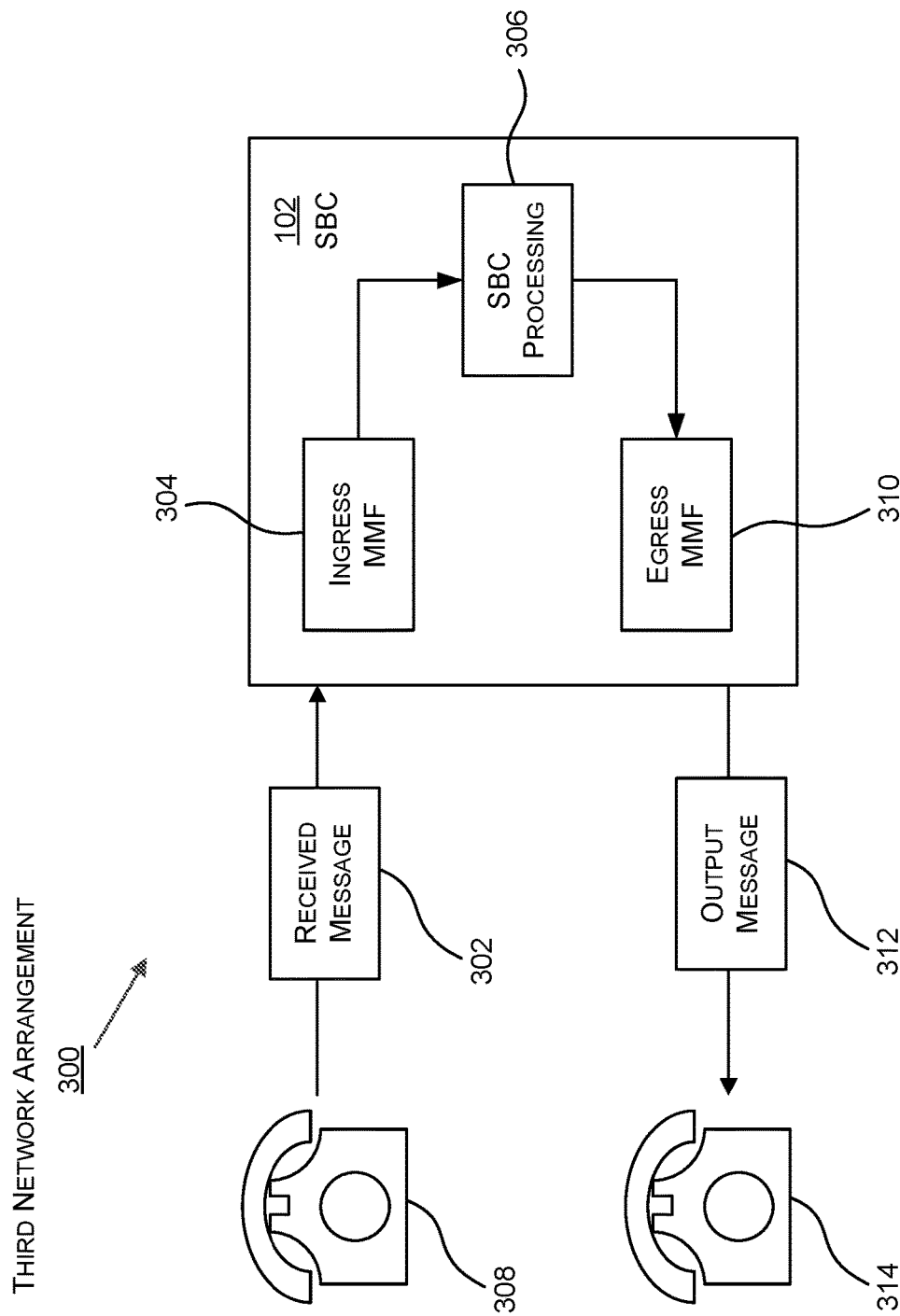
FIG. 3 illustrates a telephony-specific arrangement for message manipulation.

FIG. 3 illustrates a telephony-specific arrangement for message manipulation, referred to as a third network arrangement 300. In this third network arrangement 300, the MMF is divided into two parts and is distinct from the SBC processing unit 306. In this embodiment, a received message 302 is transmitted from a first device 308 such as user equipment. The received message 302 is transmitted to an ingress MMF 304 which at least partially rewrites the inbound received message 302. The SBC processing unit 306 then processes the message as though it had received the message straight from the first device 308. Once processed by the SBC processing unit 306, the message is passed to the egress MMF 310, which then further processes the message according to one or more rules into an output message 312. The output message 312 is then transmitted to a second device 314 such as a user equipment.

Ingress MMF 304 rules are configured for received messages, or for a subset of received messages, based on the contents of the message and the way in which it was received (e.g. the IP address/port it was received on, the IP address/port it was received from, etc). Similarly, egress MMF 310 rules are configured for messages or for a subset thereof, based on the contents of the message and the way in which it is to be sent.

Figure 4:
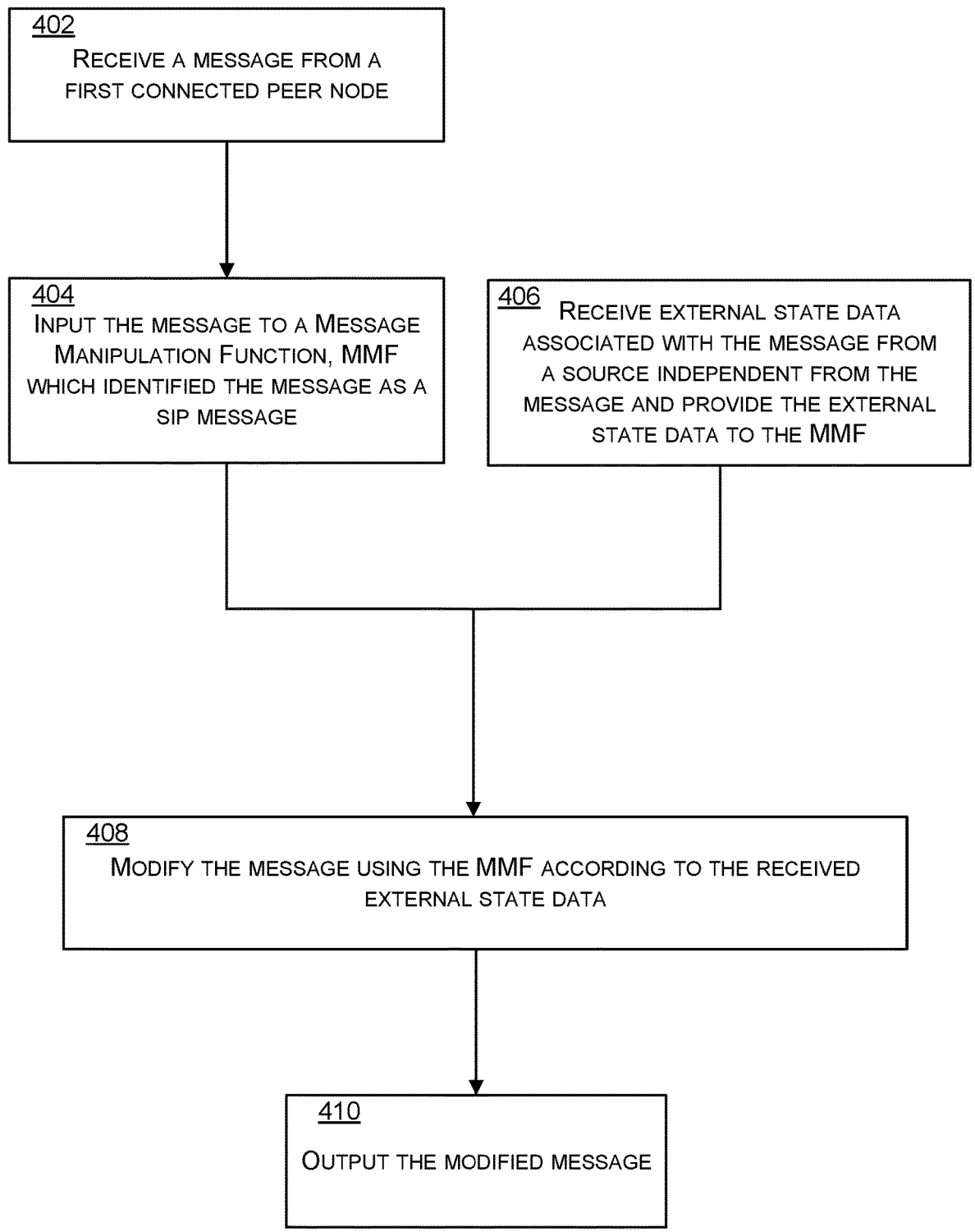
FIG. 4 is a flow diagram of a method for message manipulation using an MMF.

FIG. 4 is a flow diagram of a method for message manipulation using an MMF. In an example the method of FIG. 4 is performed by an SBC. In this embodiment, a message is received in step 402 from a connected peer node. The message is then input in step 404 to a Message Manipulation Function, MMF, which identifies the message as a SIP message. In response, the MMF also receives external state data associated with the message from a source independent from the message in step 406. Using the received external state data associated with the message from a source independent from the message, step 408 modifies the message using the MMF. The modified message is then output in step 410, optionally to the connected peer node.

Any computer executable instructions required to perform the method or provide the SBC as disclosed herein may be provided using any computer-readable media that is accessible by a computing based device. Computer-readable media includes, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device.

Alternatively or in addition to the other examples described herein, examples include any combination of the following clauses:

Clause A: A session border controller for modifying a Session Initiation Protocol, SIP, message, comprising: a processor operable to: receive a message from a connected peer node; input the message to a Message Manipulation Function, MMF; identify the message as a SIP message; in response to identifying the message as a SIP message, receive external state data associated with the message from a source independent from the message and provide the external state data to the MMF; modify the message using the MMF according to one or more conditions or rules associated with the received external state data; and output the modified message.

Clause B: The apparatus of Clause A, wherein the external state data corresponds to the interaction of the message with an external device configuration.

Clause C: The apparatus of any preceding clause, wherein the external state data corresponds to the state of a transaction associated with the message.

Clause D: The apparatus of any preceding clause, wherein the external state data corresponds to the state of one or more networking devices associated with the message.

Clause E: The apparatus of any preceding clause, wherein the external state data corresponds to a combination of: the interaction of the message with an external device configuration; the state of one or more networking devices associated with the message; and/or the state of one or more networking devices associated with the message.

Clause F: The apparatus of any preceding clause, wherein the external state data is logically independent from contents and networking properties of the SIP message.

Clause G: The apparatus of Clause F, wherein the SBC is a point of demarcation between different parts of a communications network, and wherein the connected peer node is in a first one of the parts of the communications network, and wherein the SBC is configured to output the modified message to a second one of the parts of the communications network.

Clause H: The apparatus of any preceding clause, wherein the external state data corresponds to a transcoding property of the message.

Clause I: The apparatus of any preceding clause, wherein the external state data corresponds to a database of ban listed users.

Clause J: The apparatus of any preceding clause, wherein the external state data corresponds to a database of subscribed users.

Clause K: The apparatus of any preceding clause, wherein the external state data corresponds to a live status of the connected peer node.

Clause L: The apparatus of Clause K, wherein the live status corresponds to an ongoing voice call.

Clause N: The apparatus of any preceding clause, wherein the modified message is output to the connected peer node.

Clause N: The apparatus of any preceding clause, wherein the processor is further operable to: receive a further message from a further one or more connected peer nodes; input the further message to the MMF; identify the message as a SIP message; in response to identifying the message as a SIP message, receive external state data associated with the further message from a source independent from the further message and provide the external state data to the MMF; modify the further message using the MMF according to one or more conditions or rules associated with the received external state data; and output the modified further message.

Clause O: The apparatus of any preceding clause, wherein the MMF is divided into two parts, comprising an ingress MMF and an egress MMF.

Clause P: A method of message manipulation, comprising the steps of: receiving a message from a connected peer node; inputting the message to an MMF; identifying the message as a SIP message; in response to identifying the message as a SIP message, receiving external state data associated with the message from a source independent from the message and providing the external state data to the MMF; modifying the message using the MMF according to one or more conditions or rules associated with the received external state data; and outputting the modified message.

Clause Q: A system for message modification, comprising at least one peer node operable to transmit a SIP message to a session border controller; a database of external state data associated with the message from a source independent from the message; a session border controller comprising an MMF operable to receive external state data from the database, and further operable to modify the SIP message according to one or more conditions or rules associated with the external state data.

Clause R: The system of Clause Q, further comprising an interface in electronic communication with the session border controller, the interface comprising permission-based controls.

Clause S: The system of Clause Q or Clause R, further comprising a Distributed Access Manager, DAM, in electronic communication with the session border controller.

Clause T: The system of Clause S, wherein the DAM also in electronic communication with one or more further session border controllers.

A method for modifying a Session Initiation Protocol (SIP) message by a Message Manipulation Function (MMF) component executing on a computing device, the MMF component configured to identify SIP messages and update the messages based on one or more conditions or rules, method comprising: receiving a SIP message from a connected peer node; accessing external state data associated with the SIP message from a source that is external to the SIP message, wherein the external state data cannot be logically derived from contents and networking properties of the SIP message; modifying the SIP message using the external state data; and outputting the modified SIP message.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A session border controller (SBC) configured to modify a Session Initiation Protocol (SIP) message, comprising:
    a processor and a memory storing computer-executable instructions that, when executed by the processor, cause the session border controller to:
        receive a message from a connected peer node;
        input the message to a Message Manipulation Function (MMF);
        identify the message as a SIP message; and
        in response to identifying the message as a SIP message,
            access external state data associated with the message, wherein the external state data is from an external entity independent of the message and the external state data is logically independent from content and networking properties of the message,
            provide the external state data to the MMF,
            modify the message using the MMF according to one or more conditions or rules associated with the external state data, wherein the modifying comprises setting a value for a field in the message based on content of the message, the field of the message associated with the external state data, and
            output the modified message.

2. The session border controller of claim 1, wherein the external state data corresponds to interaction of the message with an external device configuration.

3. The session border controller of claim 1, wherein the external state data corresponds to a state of a transaction associated with the message.

4. The session border controller of claim 1, wherein the external state data corresponds to the state of one or more networking devices associated with the message.

5. The session border controller of claim 1, wherein the external state data corresponds to one or more of:
    interaction of the message with an external device configuration;
    a state of a transaction associated with the message; or
    the state of one or more networking devices associated with the message.

6. The session border controller of claim 1, wherein the SBC is a point of demarcation between different parts of a communications network, and wherein the connected peer node is in a first one of the parts of the communications network, and wherein the SBC is configured to output the modified message to a second one of the parts of the communications network.

7. The session border controller of claim 1, wherein the external state data corresponds to a transcoding property of the message.

8. The session border controller of claim 1, wherein the external state data corresponds to a database of ban listed users.

9. The session border controller of claim 1, wherein the external state data corresponds to a database of subscribed users.

10. The session border controller of claim 1, wherein the external state data corresponds to a live status of the connected peer node.

11. The session border controller of claim 10, wherein the live status corresponds to an ongoing voice call.

12. The session border controller of claim 1, wherein the modified message is output to the connected peer node.

13. The session border controller of claim 1, wherein the processor is further operable to:
    receive a further message from a further one or more connected peer nodes;
    input the further message to the MMF;
    identify the message as a SIP message;
    in response to identifying the message as a SIP message, access external state data associated with the further message, the external state data from an external entity logically independent of content and networking properties of the further message and provide the external state data to the MMF;
    modify the further message using the MMF according to one or more conditions or rules associated with the external state data, wherein the modifying comprises setting a value for a field in the message based on content of the message, the field of the message associated with the external state data; and
    output the modified further message.

14. The session border controller of claim 1, wherein the MMF is divided into two parts, comprising an ingress MMF and an egress MMF.

15. A method for modifying a Session Initiation Protocol (SIP) message by a Message Manipulation Function (MMF) component executing on a computing device, the MMF component configured to identify SIP messages and update the messages based on one or more conditions or rules, method comprising:
    receiving a SIP message from a connected peer node;
    accessing external state data associated with the SIP message, wherein the external state data is from an external entity that is independent of the SIP message, and the external state data cannot be logically derived from contents and networking properties of the SIP message;

modifying the SIP message using the external state data and the one or more conditions or rules, wherein the modifying comprises setting a field of the message based on a subset of the external state data, and the subset is based on a user associated with the one or more conditions or rules; and outputting the modified SIP message.

16. A system for message modification, comprising:

at least one peer node operable to transmit a SIP message to a session border controller;

a storage device storing thereon a database of external state data associated with the message from a source logically independent from content and networking properties of the message; and a session border controller comprising an MMF operable to access external state data from an external entity independent of the message, and further operable to modify the SIP message according to one or more conditions or rules associated with a user, wherein the modifying comprises setting a field of the message based on a subset of the external state data, and the subset is based on the user associated with the one or more conditions or rules.

17. The system of claim 16, further comprising an interface communicatively coupled with the session border controller, the interface comprising permission-based controls for determining which subset of the external state data the user associated with the one or more rules is access permissions users are entitled to access.

18. The system of claim 16, further comprising a Distributed Access Manager (DAM) communicatively coupled with the session border controller.

19. The system of claim 18, wherein the DAM is communicatively coupled with one or more further session border controllers.

20. The method of claim 15, wherein the message is associated with a call between a plurality of peer nodes including the connected peer node, the external state data is state data of the connected peer node, and the external state data is associated with the call.

* * * * *